United States Patent
Hara et al.

[11] Patent Number: 6,044,228
[45] Date of Patent: Mar. 28, 2000

[54] CAMERA CAPABLE OF SHAKE CORRECTION

[75] Inventors: Yoshihiro Hara, Kishiwada; Tomonori Satoh, Sakai; Keiji Tamai, Suita; Junji Sato, Sakai, all of Japan

[73] Assignee: Minolta Co., Ltd., Osaka, Japan

[21] Appl. No.: 09/150,457

[22] Filed: Sep. 9, 1998

[30] Foreign Application Priority Data

Sep. 9, 1997 [JP] Japan ................................. 9-244418
Sep. 9, 1997 [JP] Japan ................................. 9-244419

[51] Int. Cl.[7] .......................... G03B 7/093; G03B 17/00
[52] U.S. Cl. ............................................. 396/55; 396/246
[58] Field of Search ................................ 396/54, 55, 246

[56] References Cited

U.S. PATENT DOCUMENTS 5,210,563  5/1993  Hamada et al. ........................... 354/400
5,469,210  11/1995  Noguchi et al. ........................ 348/208
5,848,300  12/1998  Imura ....................................... 396/55

FOREIGN PATENT DOCUMENTS 6-308588  11/1994  Japan .
7-261230  10/1995  Japan .

*Primary Examiner*—W. B. Perkey
*Attorney, Agent, or Firm*—Sidley & Austin

[57] ABSTRACT

A camera capable of shake correction, and is provided with: a sensor for sensing a light image of an object to detect a camera shake; an exposure time setter for setting a first exposure time based on a brightness of an object and a second exposure time smaller than the first exposure time; and a controller for judging as to whether the shake correction is disable, and controlling exposure with reference to the second exposure time when the shake correction is judged to be disable.

20 Claims, 11 Drawing Sheets

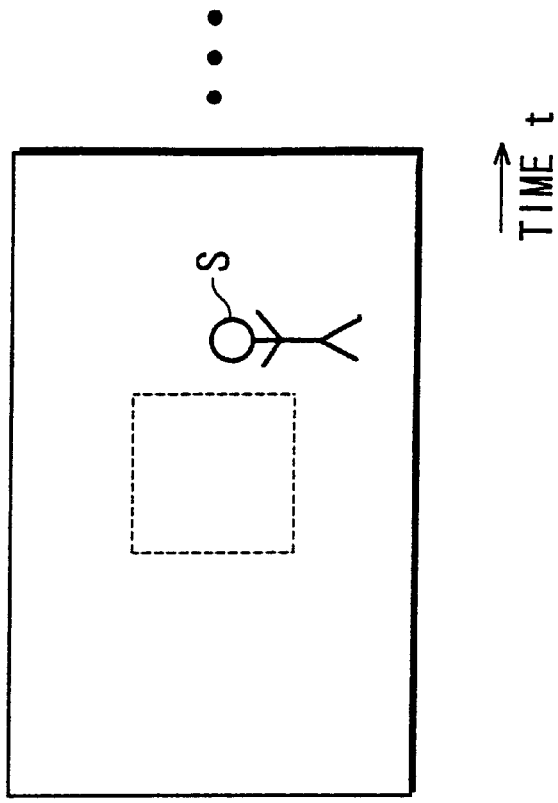
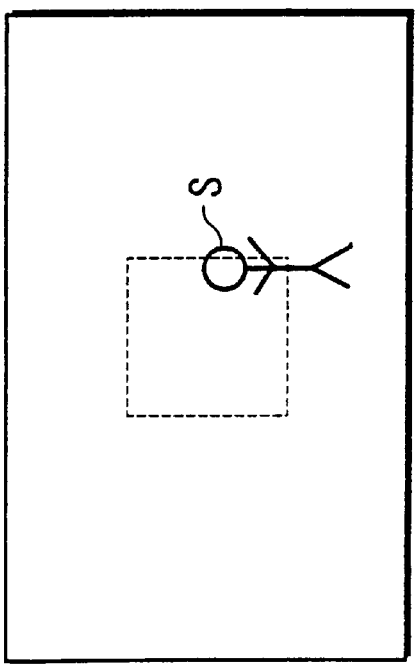
FIG. 14A
FIG. 14B

CAMERA CAPABLE OF SHAKE CORRECTION

This application is based on patent application Nos. 9-244418 and 9-244419 filed in Japan, the contents of which are hereby incorporated by reference.

BACKGROUND OF THE INVENTION

This invention relates to a camera which can perform an exposure control while correcting a displacement of an object light image caused by a shake of a main body of the camera relative to an object.

Recently, there have been proposed various cameras capable of shake correction. In such a camera, an area sensor comprising a multitude of photoelectric conversion elements arrayed in a two-dimensional form such as Charge Coupled Device (CCD) is used to detect a shake amount of an object light image particularly resulting from a camera shake, and a displacement of the object light image is corrected in such a manner as to cancel the shake amount. Also, video cameras and electronic still cameras having a shake correcting function similar to the above are available on the market.

A basic idea of shake correction in the above cameras is to perform shake correction during an image exposure to obtain a photographed image without an image deterioration due to a camera shake. However, it is not always the case that shake correction is completed within the exposure period. For example, when the contrast (spatial frequency) of an instant light image detected by the area sensor is low, an accurate shake amount detection becomes difficult due to the low contrast, thereby disabling the shake correction.

Another cause of obstructing shake correction should be considered in the aspect of a positional relationship between a sensing region of the area sensor and a main object image. FIGS. 14A and 14B show positional relationships between the sensing region shown by the dotted-square and a main object S.

Specifically, in the case where the camera is greatly shaken, the main object S greatly moves in the field of view, and finally goes out of the sensing region, as shown in FIG. 14B. In this case, shake correction cannot be performed. Usually, the sensing region is partly provided in the field of view to ensure quick shake detection. Accordingly, in the case where the main object S is first sensed at an edge of the sensing region, as shown in FIG. 14A, the main object S is liable to go out of the sensing region due to a shake (see FIG. 14B). Consequently, shake correction is disabled.

Also, in a case where a shake correction device is so constructed as to cancel a shake amount by moving a shake correction lens, and detected is a shake amount that may exceed an extreme position where the shake correction lens is difficult to freely move further, shake correction is disabled after the correction lens is moved to the extreme position.

To solve the above problems, there have been proposed the following shake corrections.

U.S. Pat. No. 5,210,563 proposes an arrangement of firing a flash when the contrast of an object image is low. In this arrangement, in the case where the main object S is out of the sensing region as shown in FIG. 14B, shake detection cannot be executed even though the flash is fired. Also, this arrangement is not effective in the case that the main object S is located out of an area of flashlight coverage.

Japanese Unexamined Patent Publication No. HEI 6-308588 discloses an arrangement where, in the case of photographing an object in a low brightness while being hand-held (high likelihood of camera shake), an exposure time smaller than an optimum exposure time is set before starting exposure, and exposure is performed in the shorter time. In this arrangement, the exposure time is determined before starting exposure. The exposure is controlled irrespective of camera shake during exposure. Accordingly, this arrangement cannot finely control the exposure in accordance with a variable camera shake during exposure.

Japanese Unexamined Patent Publication No. HEI 7-261230 discloses an arrangement wherein shake correction is temporarily suspended when a camera shake goes beyond a correctable range of a correction lens, and then resumed upon the correction lens returning to the correctable range. In this arrangement, the exposure is performed for an initially set exposure time even if shake correction is not resumed. Accordingly, this arrangement is not effective in reducing the influence of camera shake to a photographed image.

SUMMARY OF THE INVENTION

It is an object of the present invention to provide a camera which has overcome the problems residing in the prior art.

According to an aspect of the invention, a camera provided with a function of shake correction during exposure comprises: an image taking unit which exposes a photosensitive medium to a light image of an object; a sensor which senses a light image of an object to detect a camera shake; an exposure time setter which sets a first exposure time based on a brightness of an object, and a second exposure time different from the first exposure time; and a controller which judges, based on whether the sensor senses a light image having a contrast lower than a predetermined contrast for a predetermined time, as to whether the shake correction is disable, and controls the exposure of the photosensitive medium with reference to the second exposure time when the shake correction is judged to be disable.

According to another aspect of the invention, a camera provided with a function of shake correction during exposure comprises: an image taking unit which exposes a photosensitive medium to a light image of an object; a sensor which senses a light image of an object to detect a camera shake; an exposure time setter which sets a first exposure time based on a brightness of an object, and a second exposure time different from the first exposure time; and a controller which judges, based on whether a light image of a particular object is shifted more than a predetermined amount with respect to the sensor, as to whether the shake correction is disable, and controls the exposure of the photosensitive medium with reference to the second exposure time when the shake correction is judged to be disable.

According to still another aspect of the invention, a camera provided with a function of shake correction during exposure comprises: an image taking unit which exposes a photosensitive medium to a light image of an object; a sensor which senses a light image of an object to detect a camera shake; a correction lens which corrects a camera shake, and is movable in a predetermined range; an exposure time setter which sets a first exposure time based on a brightness of an object, and a second exposure time different from the first exposure time; and a controller which judges, based on whether the correction lens reaches an end of the predetermined range, as to whether the shake correction is disable, and controls the exposure of the photosensitive medium with reference to the second exposure time when the shake correction is judged to be disable.

According to yet another aspect of the invention, a camera provided with a function of shake correction during exposure comprises: an image taking unit which exposes a photosensitive medium to a light image of an object; an exposure time setter which sets a first exposure time based on a brightness of an object, and a second exposure time to ensure an exposure amount necessary to enable image correction in the process of printing a taken-up image; and a controller which judges as to whether the shake correction is disable, and controls the exposure of the photosensitive medium with reference to the second exposure time when the shake correction is judged to be disable.

According to further another aspect of the invention, a camera provided with a function of shake correction during exposure comprises: an image taking unit which exposes a photosensitive medium to a light image of an object; a controller which judges as to whether the shake correction is disable, and stops the shake correction when the shake correction is judged to be disable; a timer which measures a lapse of time after the shake correction is stopped. The controller compares a measured lapse of time with a predetermined reference time, and controls the exposure of the photosensitive medium in accordance with a comparison result.

These and other objects, features and advantages of the present invention will become more apparent upon a reading of the following detailed description and accompanying drawings.

BRIEF DESCRIPTION OF THE DRAWINGS

FIG. 14A is a diagram showing a state that a main object is located in a sensing region of an area sensor when shake detection is started; and FIG. 14B is a diagram showing a state that a main object is relatively shifted from the sensing region of the area sensor during the shake detection.

DETAILED DESCRIPTION OF THE PREFERRED EMBODIMENT OF THE INVENTION

Figure 1:
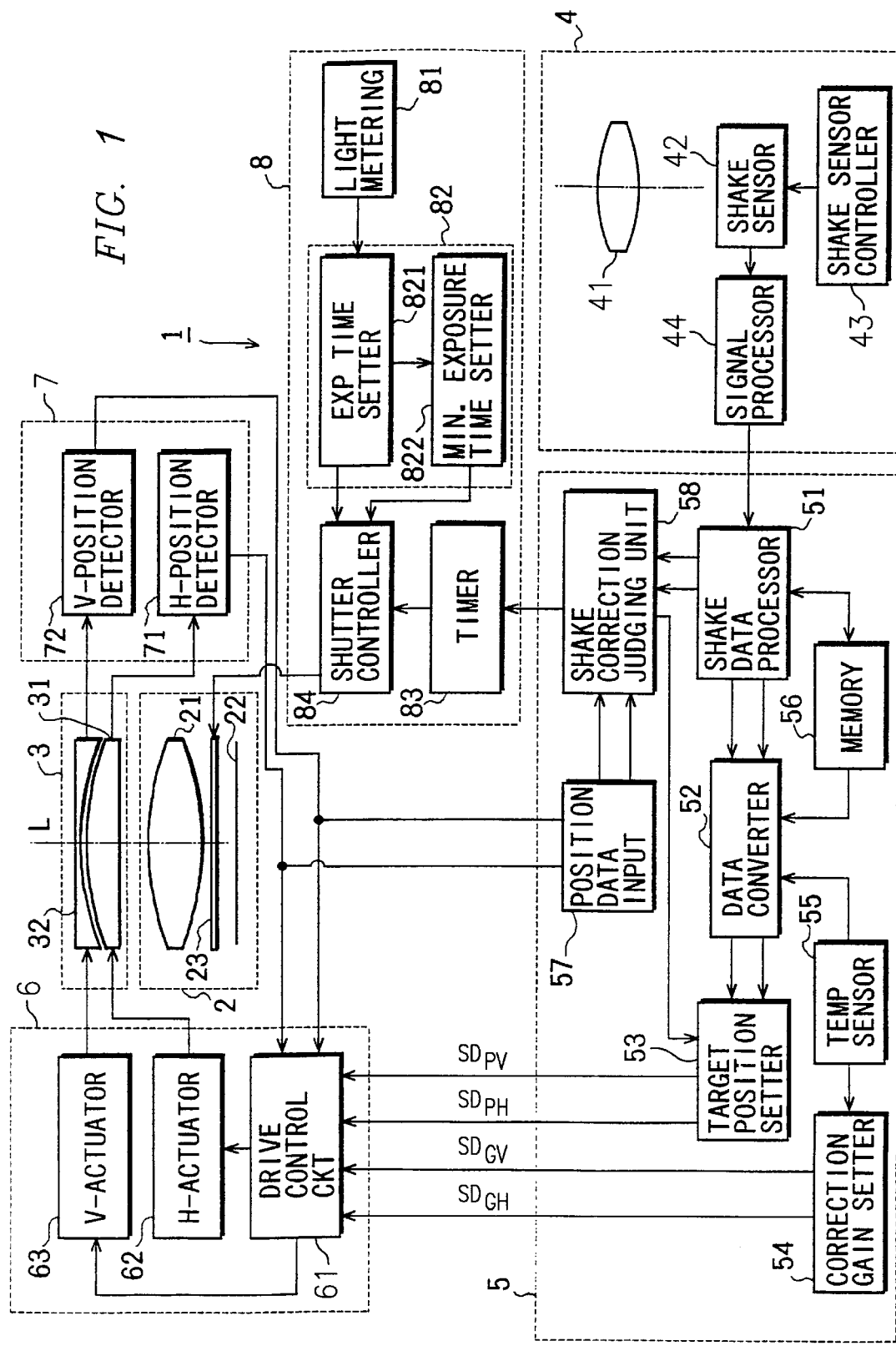
FIG. 1 is a block diagram showing a camera embodying the present invention.

FIG. 1 is a block diagram showing a control construction of a camera embodying the invention. A camera 1 includes a picture taking section 2, a correction lens unit 3, a shake detecting section 4, a shake correction section 5, a driving section 6, a position detecting section 7, and an exposure controlling section 8.

The picture taking section 2 includes a taking lens 21 having an optical axis L, a mechanism (not shown) for feeding a loaded film 22 to a focusing position on the optical axis L, and a shutter 23 disposed in front of the film 22, and is adapted to take up a light image of an object image.

The correction lens unit 3 includes horizontal and vertical shake correction lenses 31, 32 provided before the taking lens 21 and is adapted to correct a displacement of an object light image by means of a refraction. The horizontal and vertical correction lenses 31,32 have optical axes parallel to the optical axis L, respectively and are so supported as to be movable on a plane normal to the optical axis L in horizontal and vertical directions which are normal to each other.

The shake detecting section 4 includes a detection lens 41, a shake sensor 42, a shake sensor controller 43 and a signal processor 44, and is adapted to obtain image data used to detect a displacement of an object light image caused by a shake of the main body of the camera 1 with respect to the object.

The detection lens 41 has an optical axis parallel to the optical axis L of the taking lens 21 and focuses the object light image on the shake sensor 42 provided therebehind. The shake sensor 42 is an area sensor in which a multitude of photoelectric conversion elements such as CCD are arrayed in a two-dimensional manner, and is adapted to sense the object light image focused by the detection lens 41 and to generate an electrical signal corresponding to the amount of received light. The image signal is a collection of the respective pixel signals from the photoelectric conversion elements.

The shake sensor controller 43 controls the shake sensor 42 to sense the object light image for a predetermined time duration (time for accumulating electric charges, or simply referred to as "integration time") and to send the respective pixel signals obtained during this sensing operation to the signal processor 44. The signal processor 44 applies specified signal processings (signal amplification, offset adjustment, etc.) to the image signal sent from the shake sensor 42, and converts the analog image signal into digital image data.

Figure 2:
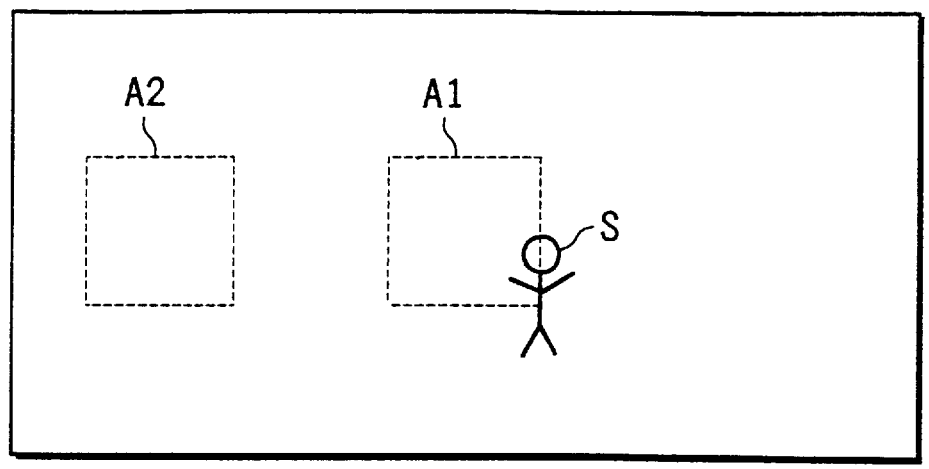
FIG. 2 is a diagram showing the position of sensing regions relative to an object image when the camera is set in a horizontal posture.

FIG. 2 is a diagram showing the position of sensing regions of the shake sensor 42. In this embodiment, the shake sensor 42 is constructed so as to sense two portions of the field of view, a center sensing region A1 directed to a center portion of the field of view and an end region A2 directed to an end portion of the field of view. More specifically, the shake sensor 42 is provided with two separate light receiving surfaces, one being adapted for receiving light rays from a center portion of the object and defining the center sensing region A1, and the other being adapted for receiving light rays from an end portion of the object and defining the end sensing region A2.

The shake sensor 42 may be provided with a single light receiving surface for receiving light rays from the whole object. In this case, an image signal from the shake sensor 42 is so processed in the signal processor 44 so as to generate only two image data corresponding to the two sensing regions A1 and A2, respectively.

Next, the shake correction section 5 is described with reference to FIG. 1. The shake correction section 5 includes a shake data processor 51, a data converter 52, a target position setter 53, a correction gain setter 54, a temperature sensor 55, a memory 56, a position data input device 57, and a shake correction judging section 58, and is adapted to set control data for allowing the driving section 6 to generate a drive signal which is described later.

The temperature sensor 55 is adapted to detect an ambient temperature of the camera 1. The memory 56 includes a RAM for temporarily storing data such as image data and shake amount data to be used in the shake data processor 51, and a ROM for storing a conversion coefficient to be used in the data converter 52, and the like.

Figure 3:
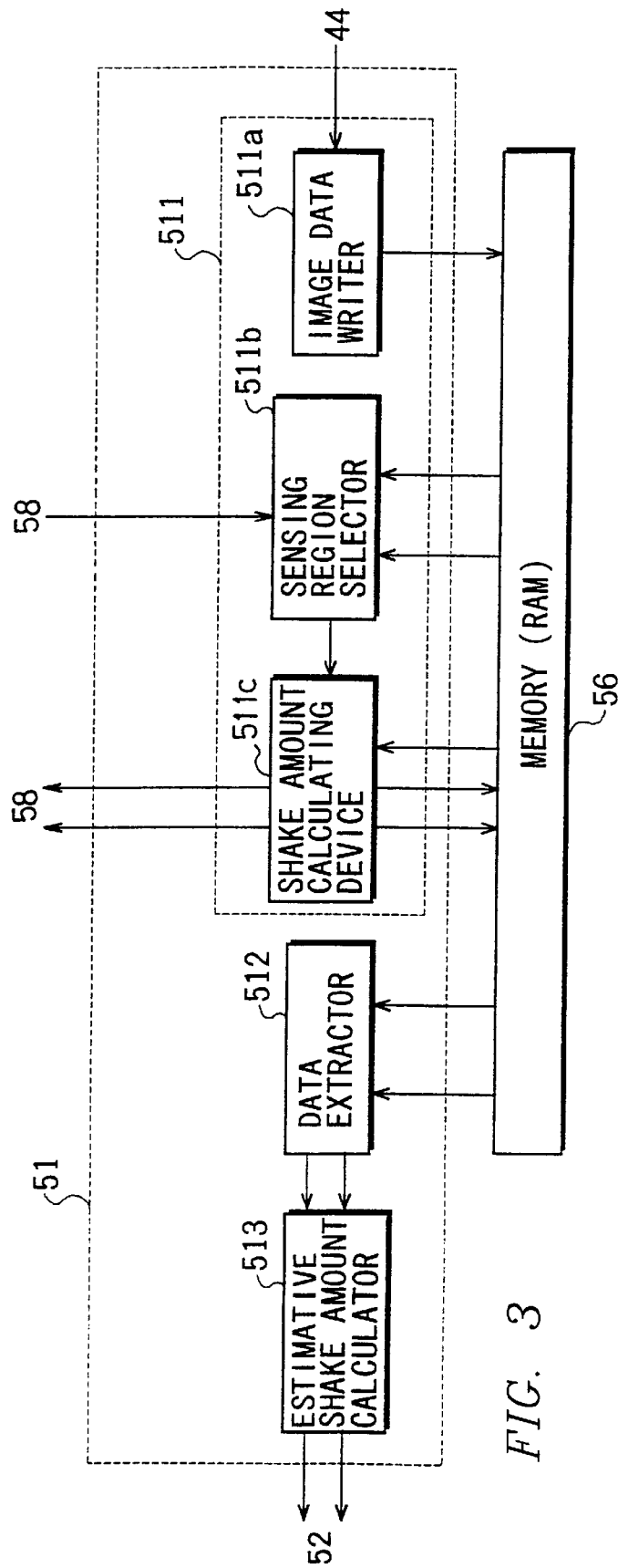
FIG. 3 is a block diagram showing a construction of a shake data processor provided in the camera.

Referring to FIG. 3, the shake data processor 51 is described. The shake data processor 51 comprises an actual shake amount calculator 511, a data extractor 512, and an estimative shake amount calculator 513. The shake data processor 51 calculates an actual shake amount based on image data from the signal processor 44 and then calculates an estimative shake amount based on a calculated actual shake amount.

The actual shake amount calculator 511 includes an image data writer 511a, a sensing region selector 511b, and an actual shake amount calculating device 511c. The image data writer 511a writes image data corresponding to the sensing regions A1 and A2 on specified addresses of the RAM of the memory 56.

The sensing region selector 511b selects either one of the sensing regions A1, A2 in accordance with a predetermined selection manner. For example, comparing contrast values (spatial frequency) of the sensing regions A1 and A2, and either of the sensing region A1 (A2) is selected which provides image data having higher contrast value than the other. The sensing region selector 511b allows output of image data in a selected sensing region to the shake correction judging section 58.

Next, the actual shake amount calculating device 511c is described. The actual shake amount calculating device 511c is adapted for calculating an actual shake amount based on image data of the sensing region A1 (A2) selected by the sensing region selector 511b. Specifically, the actual shake amount calculating device 511c uses latest image data stored in the memory 56. A shake amount is calculated by comparing in the unit of pixel instant image data that is sensed by the selected sensing region A1 (A2) with base image data. The base image data is described later in detail. A shake amount in the horizontal direction and a shake amount in the vertical direction are calculated, and are temporarily stored in the memory 56.

The actual shake amount calculating device 511c sends the calculation result (moved amount) as a detected shake amount to the shake correction judging section 58.

Figure 4:
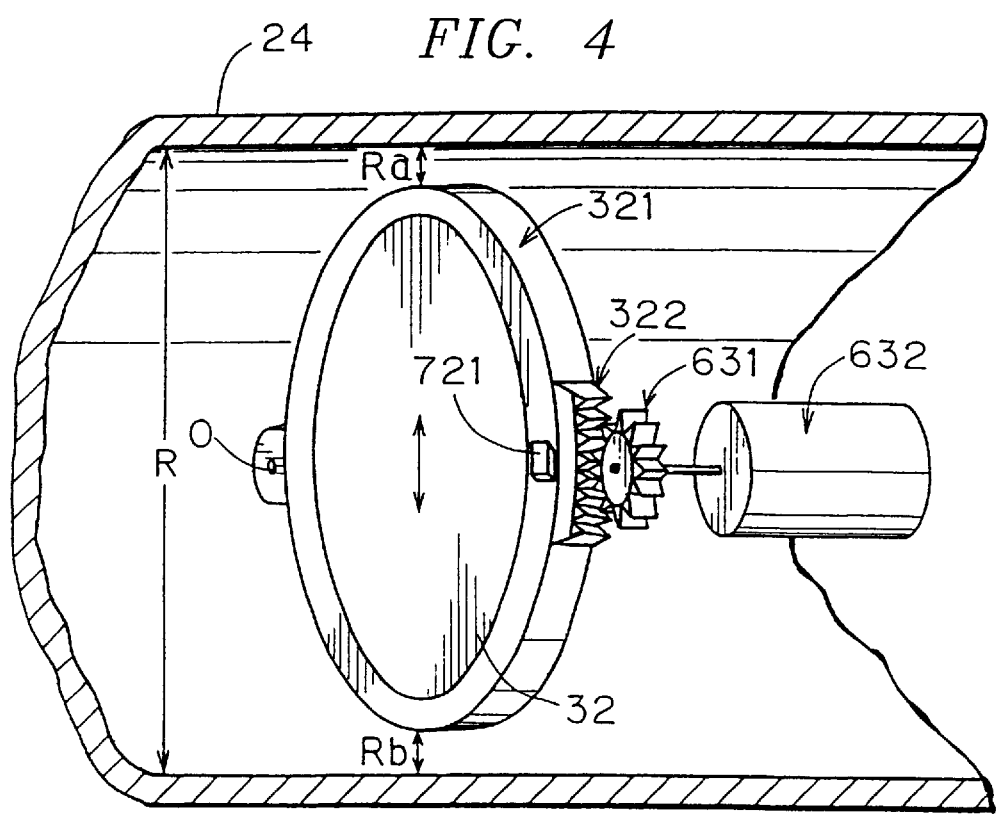
FIG. 4 is a perspective view of a vertical correction lens and its peripheral devices accommodated in a lens barrel of the camera.

FIG. 4 is a perspective view of the vertical correction lens 32 accommodated in a lens barrel 24 of the camera 1. The vertical correction lens 32 is held by a ring frame 321, and is pivotable about a pivot O on a vertical plane. A rack gear 322 is formed on a periphery of the ring frame 321 in a portion opposite to the pivot point O. A motor 632 has a pinion gear 631 which is meshed with the a rack gear 322. When the motor 632 is driven, the pinion gear 631 is rotated, the ring frame 321 is consequently pivoted on the vertical plane by the way of the rack gear 322.

As can be seen clearly from FIG. 4, the vertical correction lens 32 is movable on the vertical plane within a space R that is substantially identical to an inner diameter of the lens barrel 24. The construction of the horizontal correction lens 31 is similar to that of the vertical correction lens 32 except that the horizontal correction lens 31 is movable in a horizontal plane normal to the vertical plane on which the vertical correction lens 32 moves. Accordingly, description on the construction of the horizontal correction lens 31 is omitted herein.

The base image data, which is used in the actual shake amount calculating device 511c, is image data obtained by the shake sensor 42 when the horizontal correction lens 31 and the vertical correction lens 32 are set in a specified position, e.g., in center position from which the lens 31 or 32 is movable an equal distance (Ra=Rb in FIG. 4) in the opposite directions.

Figure 5:
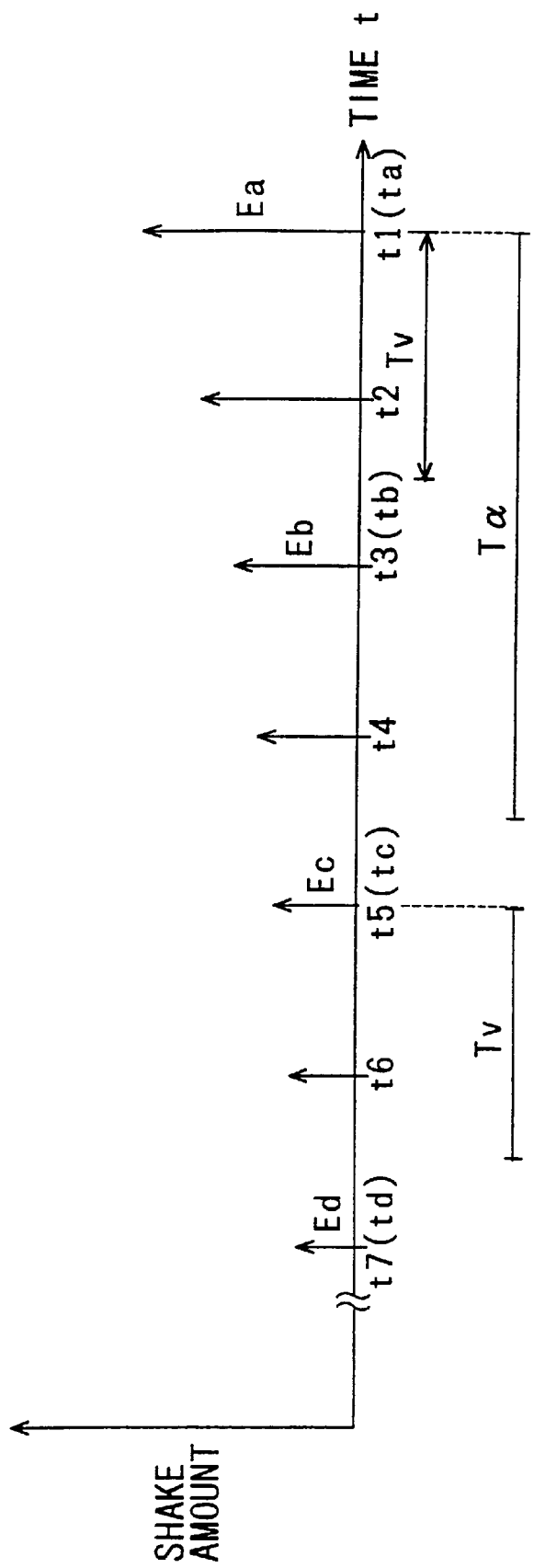
FIG. 5 is a diagram showing an extraction of shake amount data.

Next, shake amount data extraction of the data extractor 512 is described with reference to FIG. 5. The shake data extractor 512 extracts four shake amount data including a latest shake amount data from the memory 56 based on reference time spaces (time space Tv for calculation of reliable shake speed, and time space T α for calculation of reliable shake acceleration rate).

Specifically, a first shake amount data Ea at a latest image pickup time t1 is extracted. This time is hereinafter referred to as "time ta". Also extracted is a second shake amount data Eb at an image pickup time t3 (hereinafter, referred to as "time tb") which is prior to the time space Tv before the time ta and latest to the time ta. Also extracted is a third shake amount data Ec at an image pickup time t5 (hereinafter, referred to as "time tc") which is prior to the time space T α before the time ta and latest to the time ta. Finally, also extracted is a fourth shake amount data Ed at an image pickup time t7 (hereinafter, referred to as "time td") which is prior to the time space Tv before the time tc and latest to time ta. These shake amount data Ea, Eb, Ec, Ed at the respective times ta, tb, tc, td are extracted with respect to the horizontal and vertical directions, and stored in the memory 56.

In the foregoing extraction, three shake amount data except for a shake amount data at a latest time are extracted on the basis of times which are prior to the reference time spaces before the latest time and latest to the latest time. Alternatively, it may be appreciated to extract such shake amount data on the basis of times which are nearest to the reference time spaces before the latest time, or on the basis of times which are within the reference time spaces before the latest time and further before the latest time.

Referring back to FIG. 3, the estimative shake amount calculator 513 calculates an estimative shake amount of the camera 1 based on the four shake amount data Ea, Eb, Ec, Ed which are selected with respect to the horizontal and vertical directions by the data extractor 512. Specifically, a shake speed V1 is calculated in accordance with Equation (1) based on the latest shake amount data Ea and the second shake amount data Eb, whereas a shake speed V2 is calculated in accordance with Equation (2) based on the third shake amount data Ec and the fourth shake amount data Ed. A shake acceleration rate α is calculated in accordance with Equation (3) based on the shake speeds V1, V2.

[Equation 1]

$$V1=(Ea-Eb)/(ta-tb)$$

[Equation 2]

$$V2=(Ec-Ed)/(tc-td)$$

[Equation 3]

$$\alpha = (V1 - V2)/(ta - tc)$$

Subsequently, based on the assumption that the shake changes as uniformly accelerated motion, an estimative shake amount E. is calculated in accordance with Equation (4) based on the latest shake amount data Ea, the shake speed V1 and the shake acceleration rate $\alpha$.

[Equation 4]

$$E_p = Ea + V1 \times T + \frac{1}{2} \times k \times \alpha \times T^2$$

wherein k denotes a correction coefficient, and is smaller than 1. Also, $T = (\frac{1}{2}) \times T1 + T2 + T3 + T4 + Td$. T1 denotes an integration time of the shake sensor 42, T2 denotes a time required for transferring image data from the shake sensor 42 to the memory 56, T3 denotes a time for calculating a shake amount, T4 denotes a time for calculating an estimative shake amount, and Td denotes a time until the correction lens unit 3 completes the movement of the correction lens after receiving estimative shake amount data from the shake correction section 5.

Referring back to FIG. 1, the data converter 52 converts estimative shake amount data with respect to the horizontal and vertical directions into target angular position data with respect to the horizontal and vertical directions for the correction lens unit 3 using a conversion coefficient stored in the memory 56. This converter 52 also calculates a correction coefficient based on the ambient temperature detected by the temperature sensor 55 and corrects the target angular position data using this correction coefficient. This correction coefficient is used to correct variations in the focal length of the detection lens 41 caused by a change in the ambient temperature and the refractive index of the correction lens.

The target position setter 53 converts the corrected target angular position data into target position information concerning target positions into which the horizontal shake correction lens 31 and the vertical shake correction lens 32 are moved. These target positions in the horizontal and vertical directions are set in the driving section 6 as control data $SD_{PH}$, $SD_{PV}$.

It should be appreciated that upon receiving a reset command signal from the shake correction judging section 58, the target position setter 53 outputs latest target position data in the horizontal and vertical directions which have been set in the target position setter 53 before receiving the reset command signal to the driving section 6 as the control data $SD_{PH}$, $SD_{PV}$. The reset command signal is described later.

The correction gain setter 54 calculates gain correction amounts in the horizontal and vertical directions based on the ambient temperature detected by the temperature sensor 55, and set them in the driving section 6 as control data $SD_{GH}$, $SD_{GV}$. The gain correction amounts in the horizontal and vertical directions are adapted to correct basic gains in the horizontal and vertical directions in the driving section 6. The basic gains and the control data $SD_{GH}$, $SD_{GV}$ are described later in detail.

The position data input device 57 obtains the respective positions of the horizontal and vertical shake correction lenses 31, 32 by A/D converting the respective output signals of the position detector 7. An abnormality in the lens driving system of the correction lens unit 3 is found by checking the positions of the shake correction lenses.

Figure 6:
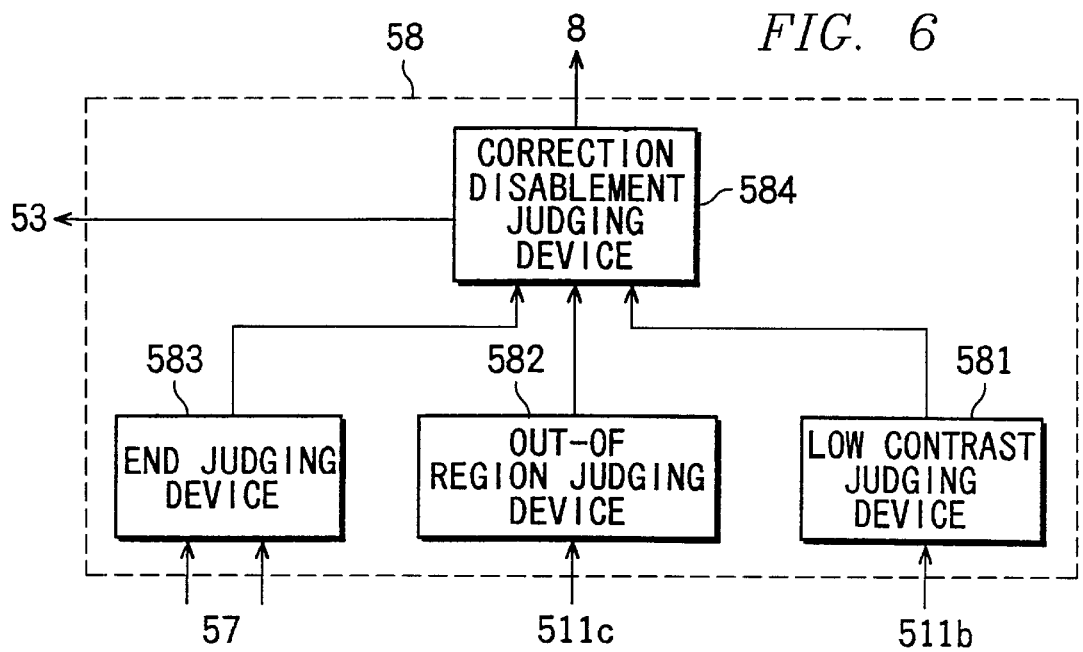
FIG. 6 is a block diagram showing a shake correction judging section of the camera.

A construction of the shake correction judging section 58 is described referring to FIG. 6.

The shake correction judging section 58 includes a low contrast judging device 581, an out-of-region judging device 582, an end judging device 583, and a correction disablement judging device 584, and is adapted to judge whether a proper shake correction is not executable.

The low contrast judging device 581 compares a contrast value of instant image data sensed by the sensing region A1 (A2) selected by the sensing region selector 511b with a predetermined reference value or threshold value to judge whether the instant image data in the selected sensing region A1 (A2) has a contrast lower than the predetermined value. Specifically, if it is judged that the contrast of the instant image data in the selected sensing region A1 (A2) is lower than the threshold value, the low contrast judging device 581 outputs a judgement result or disablement signal to the correction disablement judging device 584.

The out-of-region judging device 582 judges whether a main object image is out of the selected sensing region A1 (A2) based on a calculation result from the actual shake amount calculating device 511c. If it is judged that the main object image is out of the sensing region A1 (A2) selected by the sensing region selector 511b based on the calculation result from the actual shake amount calculating device 511c, the out-of-region judging device 582 outputs a judgement result or disablement signal to the correction disablement judging device 584.

It should be appreciated that the shake amount calculated by the actual shake amount calculating device 511c may be directly outputted to the correction disablement judging device 584 without the judgement by the out-of-region judging device 582.

The end judging device 583 judges whether at least one of the horizontal correction lens 31 and the vertical correction lens 32 reaches an extreme end position of the correction lens allowable range based on the respective position data on the horizontal correction lens 31 and the vertical correction lens 32 inputted from the position data input device 57. If the horizontal correction lens 31 (or the vertical correction lens 32) is judged to reach its end position, the end judging device 583 outputs a judgment result or disablement signal to the correction disablement judging device 584.

The correction disablement judging device 584 judges whether a proper shake correction is not executable based on a judgement result or disablement signal from the low contrast judging device 581, the out-of-region judging device 582, and the end judging device 583. In this embodiment, when receiving a disablement signal from any of the low contrast judging device 581, the out-of-region judging device 582, and the end judging device 583, the correction disablement judging device 584 judges that a proper shake correction is not executable.

Further, the correction disablement judging device 584 sends a reset command signal to the target position setter 53 to suspend the shake correction. Specifically, upon receiving the reset command signal, the target position setter 53 outputs latest target position data in the horizontal and vertical directions which have been set in the target position setter 53 before receiving the reset command signal to the driving section 6 as the control data $SD_{PH}$, $SD_{PV}$ to suspend the shake correction and spontaneously keep the horizontal correction lens 31 and the vertical correction lens 32 at their respective present positions (see a lens stop position La in FIG. 11B). A relationship between movement of the correction lenses 31 and 32 and exposure control by the exposure controlling section 8 is described later in detail with reference to FIGS. 11A and 11B.

Next, a construction of the driving section 6 is described. The driving section 6 includes a drive control circuit 61, a horizontal actuator 62, and a vertical actuator 63. The drive control circuit 61 generates horizontal and vertical drive signals based on the control data $SD_{PH}$, $SD_{PV}$, $SD_{GH}$, $SD_{GV}$ from the target position setter 53 and the correction gain setter 54. The horizontal and vertical actuators 62, 63 each include a coreless motor or the like (see the motor 632 and the pinion gear 631 in FIG. 4) and drive the horizontal and vertical shake correction lenses 31, 32 in accordance with the horizontal and vertical drive signals generated by the drive control circuit 61.

Figure 7:
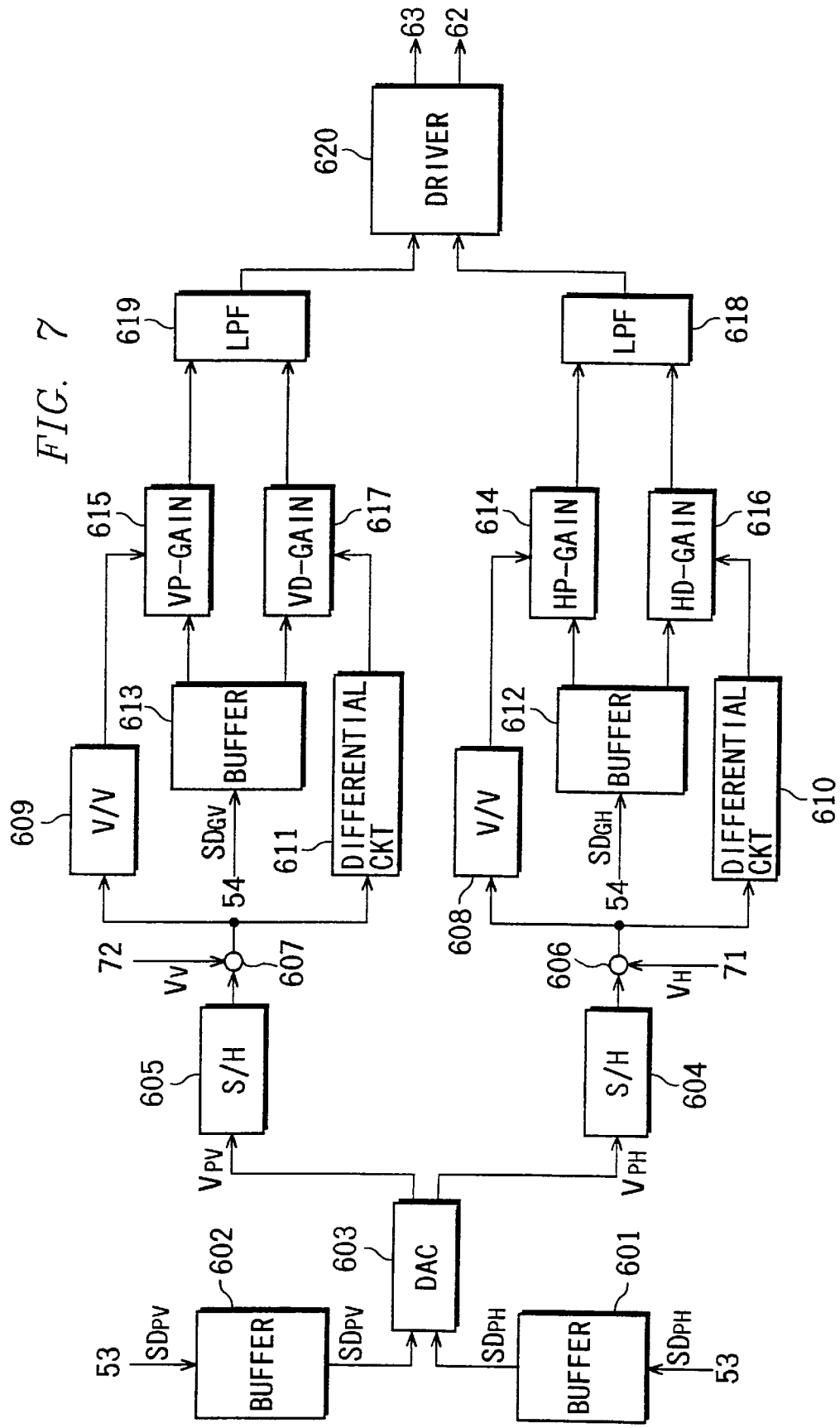
FIG. 7 is a block diagram showing a drive control circuit constituting a part of a servo control system provided in the camera.

Next, the drive control circuit 61 of the driving section 6 is described with reference to FIG. 7. FIG. 7 is a block diagram showing a construction of the drive control circuit 61 constituting part of a servo control system. First, the data $SD_{GH}$, $SD_{GV}$ set in the drive control circuit 61 are described. In the camera 1, a variation occurs in the driving performance of the lens driving system when the ambient temperature changes. For example, as the ambient temperature changes, the torque ratios of the motors (e.g., the motor 632 shown in FIG. 4), the backlash of the lens driving system of the correction lens unit 3 and the driving section 6, and the stiffness of the gears (e.g., rack gear 322 and the pinion gear 631 in FIG. 4) of the lens driving system change.

Figure 8:
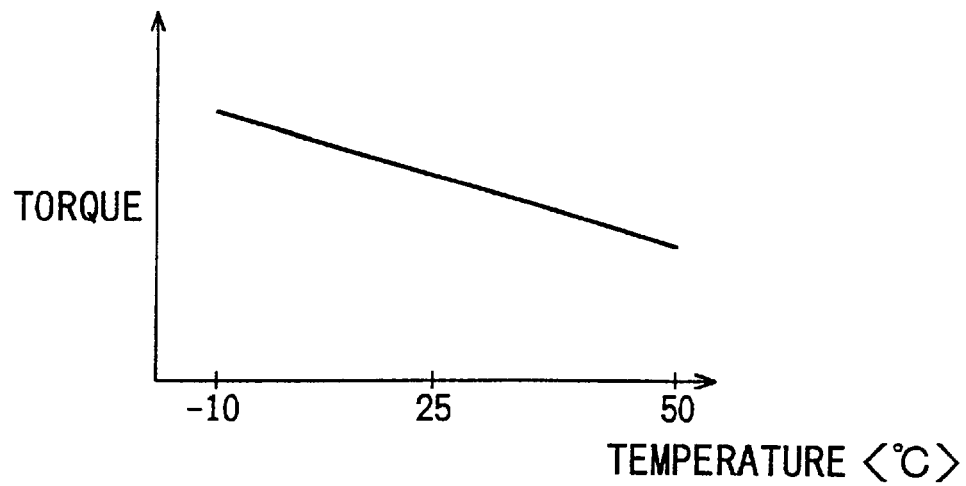
FIG. 8 is a graph showing a temperature characteristic of a drive motor provided in the camera, affecting the lens driving performance.

FIG. 8 is a graph showing a change in the driving performance (torque) of the motor with a temperature variation. As can be understood from FIG. 7, when the ambient temperature becomes different from a reference temperature (e.g., 25° C.), the motor torque changes from a value at the reference temperature. As a result, the driving performance of the lens driving system changes. In other words, the driving performance based on the basic gain of the horizontal and vertical direction (drive gains at the reference temperature) changes as the ambient temperature detected by the temperature sensor 55 changes from the reference temperature.

Accordingly, the correction gain setter 54 is constructed so as to generate gain correction data for correcting a variation in the driving performance based on the basic gain of horizontal and vertical direction in accordance with an ambient temperature detected by the temperature sensor 55. In this embodiment, there are provided functions to obtain gain correction data for individually compensating for variations in the motor torque, backlash and gears with a change in the ambient temperature from the reference temperature. The ambient temperatures detected by the temperature sensor 55 are put in the respective correction functions with respect to horizontal and vertical directions, and a sum of calculated values is obtained as a gain correction amount. The gain correction amounts with respect to horizontal and vertical directions are set in the drive control circuit 61 as the control data $SD_{GH}$, $SD_{GV}$.

Next, the drive control circuit 61 is described. Although the control data $SD_{GH}$, $SD_{GV}$ are shown to be transmitted via two signal lines in FIG. 1 to simplify the drawing, they are actually sent by serial transmission via unillustrated two data lines (SCK, SD) and three control lines (CS, DA/GAIN, X/Y). Similarly, the control data $SD_{PH}$, $SD_{PV}$ are alternately transmitted to the drive control circuit 61.

The drive control circuit 61 includes buffers and sample-and-hold circuits. In other words, buffers 601, 602 are memories for storing the data $SD_{PH}$, $SD_{PV}$ alternately set by the target position setter 53.

A digital-to-analog converter (DAC) 603 converts the control data $SD_{PH}$ in the buffer 601 and the control data $SD_{PV}$ in the buffer 602 into a target position voltage $V_{PH}$ and a target position voltage $V_{PV}$, respectively. A sample-and-hold (S/H) circuit 604 samples the target position voltage $V_{PH}$ converted by the DAC 603 and holds this value till a next sampling. Likewise, a S/H circuit 605 samples the target position voltage $V_{PV}$ converted by the DAC 603 and holds this value until a next sampling.

An adder circuit 606 calculates a difference between the target position voltage $V_{PH}$ and an output voltage $V_H$ of the horizontal position detector 71. An adder circuit 607 calculates a difference between the target position voltage $V_{PV}$ and an output voltage $V_V$ of the vertical position detector 72. In other words, the adder circuits 606, 607 obtain voltage differences by addition since the output voltages $V_H$, $V_V$ are obtained as negative voltages in the horizontal and vertical position detectors 71, 72.

Identified by V/V 608 is an amplifier for amplifying an input voltage to a voltage as a horizontal direction proportional gain at a ratio set in advance for the reference temperature. Identified by V/V 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adder circuit 606 by a differential by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adder circuit 607 by a differential by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the control data $SD_{GH}$ of the correction gain setter 54. The control data $SD_{GH}$ is gain correction amounts (proportional and differential gain correction amounts) for correcting the horizontal direction basic gain (proportional and differential gains). A buffer 613 is a memory for storing the control data $SD_{GV}$ of the correction gain setter 54. The control data $SD_{GV}$ is gain correction amounts (proportional and differential gain correction amounts) for correcting the vertical direction basic gain (proportional and differential gains).

A HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

A HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises included in the respective output voltages of the HP and HD gain correcting circuits 614, 616. A low pass filter (LPF) 619 removes high frequency noises included in the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detecting section 7 shown in FIG. 1 includes the horizontal and vertical position detectors 71, 72, which are adapted to detect the present or current positions of the horizontal and vertical shake correction lenses 31, 32, respectively.

Figure 9:
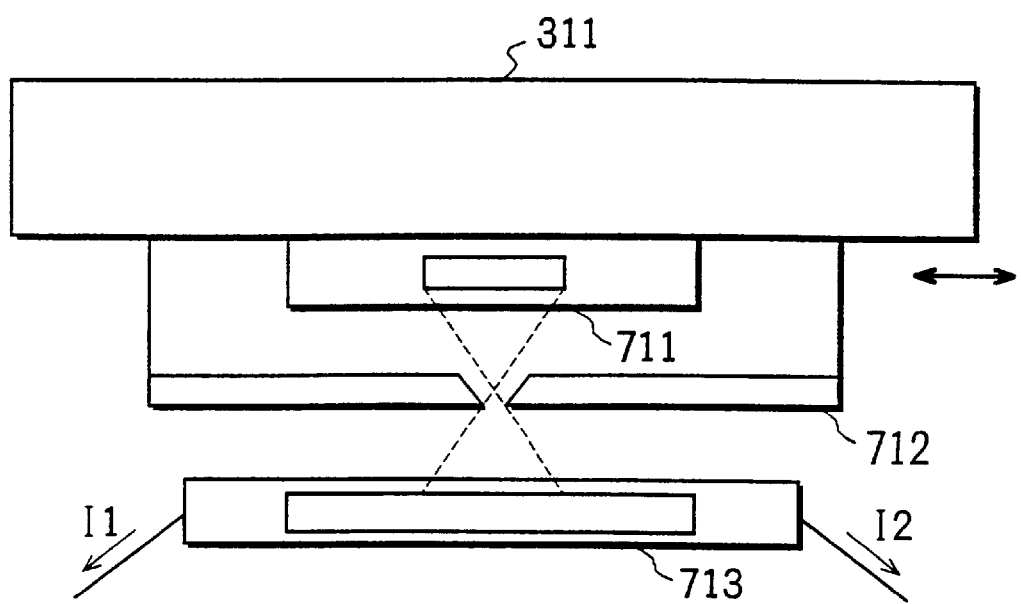
FIG. 9 is a schematic diagram of a horizontal position detector.
Figure 10:
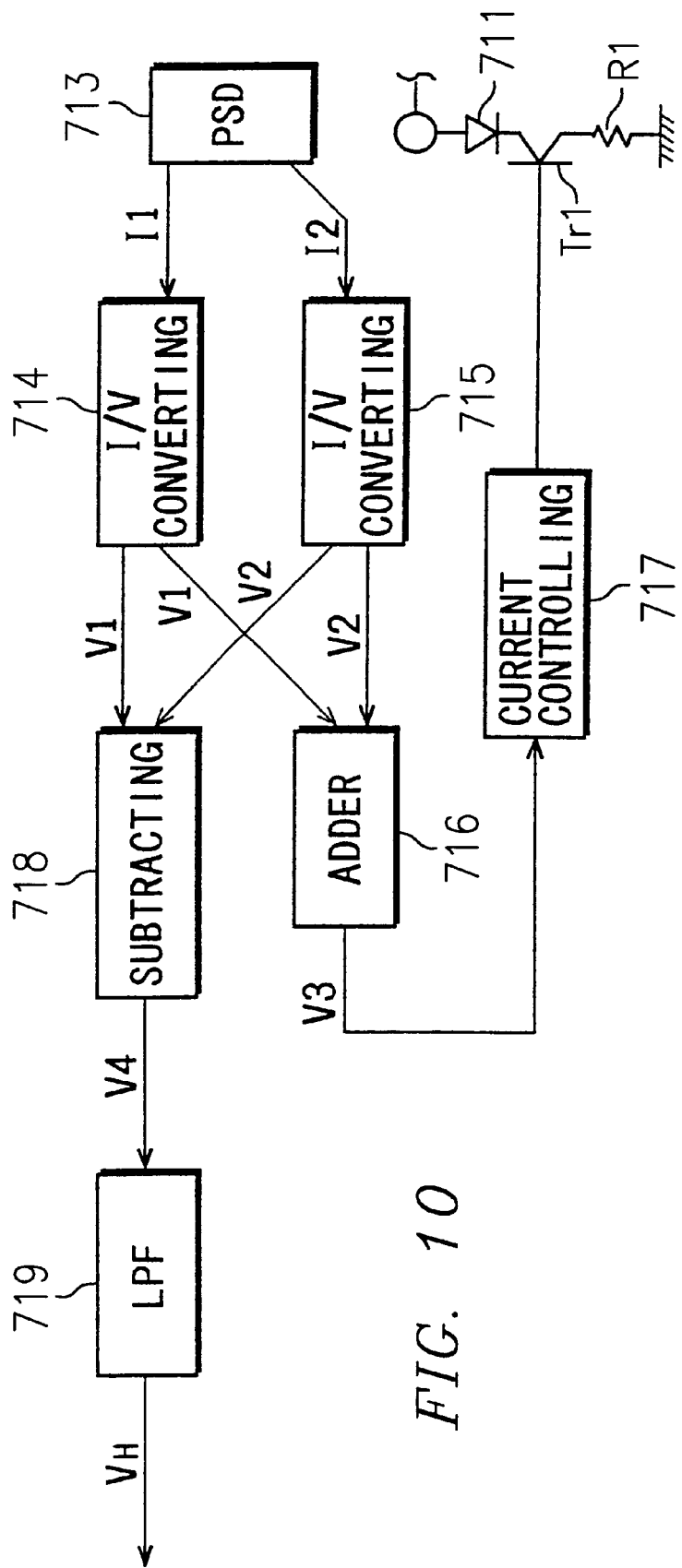
FIG. 10 is a block diagram of the horizontal position detector.

FIG. 9 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the inner wall of the lens barrel 24 of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 32. FIG. 10 is a block diagram of the horizontal position detector 71. In addition to the LED 711 and the PSD 713, the horizontal position detector 71 includes current-to-voltage (I/V) converting circuits 714, 715, an adder circuit 716, a current controlling circuit 717, a subtracting circuit 718, a low pass filter (LPF) 719, and the like. The I/V converting circuits 714, 715 respectively convert the output currents I1, I2 of the PSD 713 into voltages V1, V2. The adder circuit 716 calculates a sum voltage V3 of the output voltages V1, V2 of the I/V converting circuits 714, 715. The current controlling circuit 717 increases and decreases a base current to a transistor Tr1 so as to hold the output voltage V3 of the adder circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components included in the output voltage V4 of the subtracting circuit 718.

Next, the detection by the horizontal position detector 71 is described. The currents I1, I2 from the PSD 713 are converted into the voltages V1, V2 in the I/V converting circuits 714, 715, respectively. Subsequently, the voltages V1, V2 are added in the adder circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity) is away to the right from the center of the PSD 713 by a length x, the length x, the currents I1, I2 and a length L of a light sensing area of the PSD 713 satisfy a relationship defined by Equation(5).

$$\frac{I2 - I1}{I2 + I1} = \frac{2 \cdot x}{L}$$

Similarly, the length x, the voltages V1, V2 and the length L of the light sensing area satisfy a relationship defined by Equation (6).

$$\frac{V2 - V1}{V2 + V1} = \frac{2 \cdot x}{L}$$

If a control is performed so as to make a value of V1+V2, i.e., a value of the voltage V3 always constant, there can be obtained a relationship defined by Equation (7), in which a value of V2−V1, i.e., a value of the voltage V4 represents the length x. Accordingly, the position of the horizontal shake correction lens 31 can be detected if the voltage V4 is monitored.

[Equation 7]

$$V2-V1 \propto x$$

Referring back to FIG. 1, the exposure controlling section 8 is described. The exposure controlling section 8 comprises a light metering device 81, an exposure setter 82, a timer 83, and a shutter controller 84. The light metering device 81 includes a photoelectric conversion element, e.g., SPC (Silicon Photo Cell), for receiving light reflected from an object to detect a brightness of the object.

The exposure setter 82 includes an exposure time setter 821 for setting an optimum exposure time $t_{SS1}$ in accordance with a detected brightness of the object, and a minimum exposure time setter 822 for setting a minimum exposure time $t_{SS2}$ based on the optimum exposure time $t_{SS1}$.

In this embodiment, the minimum exposure time $t_{SS2}$ is set at a half of the optimum exposure time $t_{SS1}$. It should be noted that the minimum exposure time $t_{SS2}$ may be set less than the half of the optimum exposure time tSS1, e.g., at a quarter of the optimum exposure time $t_{SS1}$ as far as an image deterioration due to an insufficient exposure can be corrected in the process of printing the image.

The timer 83 counts an elapse of time of shake correction disablement after the shake correction judging section 58 receives the disablement signal. Specifically, when the correction disablement judging device 584 receives the disablement signal from the low contrast judging device 581, the timer 83 starts counting a time TM1 during when a low contrast continues. When the correction enable judging device 584 receives the disablement signal from the out-ofregion judging device 582, the timer 83 starts counting a time TM2 during when the out-of state of the main object continues. When the correction disablement judging device 584 receives the disablement signal from the end judging device 583, the timer 83 starts counting a time TM3 during when the correction lens 31 or 32 is at its end position.

In this embodiment, the times TM1, TM2, TM3 are initially set at "0", and individually counted upon receiving the respective disablement signals from the devices 581, 582, and 583. Alternatively, it may be appreciated to count a time during when at least one of the three correction disablement states continues.

Figure 11A:
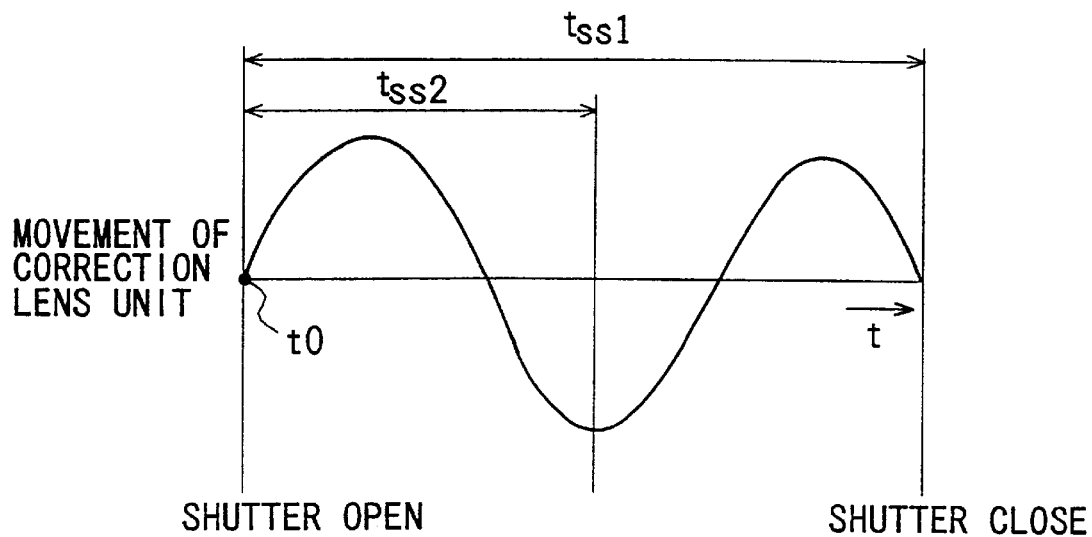
FIGS. 11A and 11B are graphs showing a relationship between an exposure time (opened/closed state of a shutter of the camera) and a movement of a correction lens, FIG. 11A showing a state that the shutter is opened for an optimum exposure time, FIG. 11B showing a state that the shutter is opened for a period shorter than the optimum exposure time.
Figure 11B:
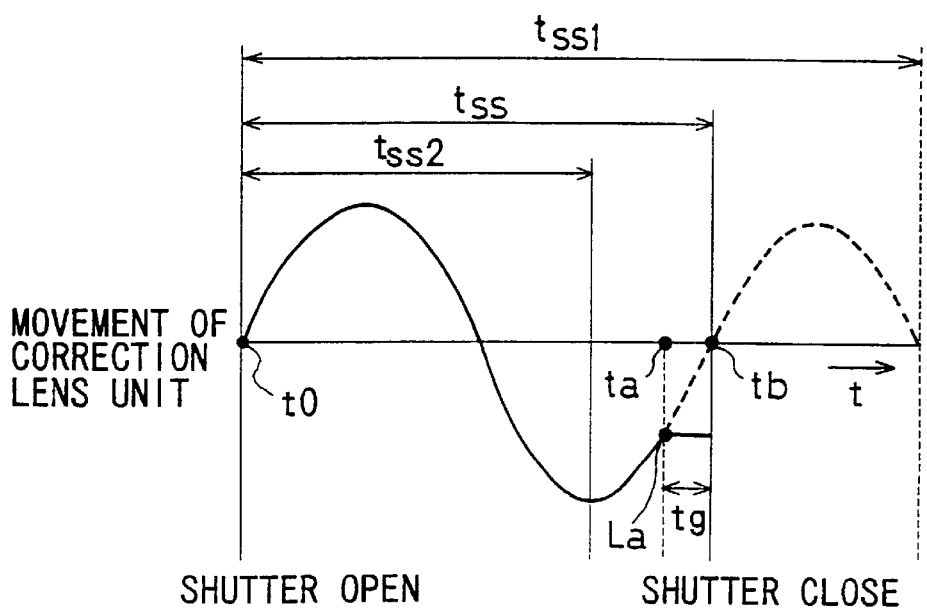

FIGS. 11A and 11B are diagrams showing an operation of the shutter controller 84 in association with movement of the correction lens 31 or 32. A horizontal axis denotes a lapse of time, and a vertical axis denotes a movement of the correction lens 31 or 32 to cancel a shake amount. At a point of time t0, the correction lens 31 or 32 is set at the center position. Spontaneously with start of shake correction, the correction lens 31 or 32 is moved from the center position.

FIG. 11A shows an operation that the shutter 23 is opened for the optimum exposure time tss1 (i.e., $t_{SS=tSS1}$, where $t_{SS}$ is an actual exposure time, and $t_{SS1}$ is the optimum exposure time), and FIG. 11B shows an operation that the shutter 23 is opened for an actual exposure time $t_{SS}$ shorter than the optimum exposure time $t_{SS1}$ and longer than the minimum exposure time $t_{ss2}$, i.e., $t_{ss2} < t_{SS} < t_{SS1}$.

More specifically, if the time TM1 (or TM2 or TM3) is 0 (i.e., no disablement signal is sent to the shake correction judging section 58, see FIG. 11A) or is shorter than a predetermined correction resume limit time tg (see FIG. 11B), the shutter controller 84 renders the shutter 23 opened for the optimum exposure time $t_{SS1}$, while executing the shake correction or moving the correction lens 31 or 32 as shown in FIG. 11A.

If the counted time TM1 (or TM2 or TM3) is shorter than the correction resume limit time tg (e.g., ⅛ of $t_{SS2}$), the shake correction is resumed immediately after the disablement signal is stopped, because the time TM1 (or TM2 or TM3) is presumed to be too short to affect photographed image quality. Accordingly, the shake correction is resumed after the lapse of the time tg.

On the other hand, if at least one of the times TM1, TM2, TM3 is beyond the correction resume limit time tg, the shutter controller 84 controls the shutter 23 in the following manner. As shown in FIG. 11B, if the correction disablement signal from one of the devices 581, 582, and 583 is issued at a time point ta after a lapse of the minimum exposure time $t_{SS2}$, the counting of the time TM1 (or TM2 or TM3) is started. If the time TM1 (or TM2 or TM3) is beyond the correction resume limit time tg as shown in FIG. 11B, the shutter controller 84 renders the shutter 23 closed at a time point tb in FIG. 11B immediately after the lapse of the time tg to terminate exposure.

If the correction disablement signal is issued before the lapse of the minimum exposure time $t_{SS2}$, the shutter controller 84 renders the shutter 23 closed immediately after the minimum exposure time $t_{SS2}$ elapses because the minimum exposure time $t_{SS2}$ is the absolutely necessary time for closing the shutter 23.

The correction resume limit time tg may be set at a time other than ⅛ of the minimum exposure time $t_{SS2}$, e.g., at a half of the optimum exposure time $t_{SS1}$, as far as displacement of an object light image can be corrected even if camera shake occurs during the correction resume limit time tg.

It should be appreciated that the shake sensor controller 43, the signal processor 44, the shake amount detector 51, the coefficient converter 52, the target position setter 53, the correction gain setter 54, the position data input device 57, the shake correction judging section 58, the exposure setter 82, the timer 83, and the shutter controller 84 may be totally constructed by a micro processing unit (MPU) which implements other various operations of the camera 1 as described in the following section. Alternatively, one or several of these components may be respectively constructed by a number of MPUs.

Next, an exposure control of the camera 1 is described with reference to FIG. 12.

Figure 12:
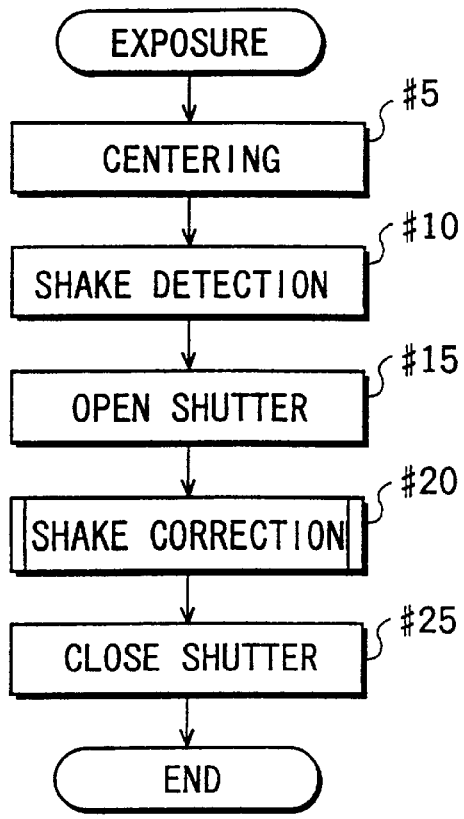
FIG. 12 is a flowchart of a routine "Exposure Control"

FIG. 12 is a flowchart of a routine "Exposure Control". This routine starts when an unillustrated shutter release button is fully pressed. First, the horizontal correction lens 31 and the vertical correction lens 32 of the correction lens unit 3 are moved to the respective center positions (in Step #5). Subsequently, a shake detection is started (in Step #10). A shake amount in the horizontal and vertical directions necessary to calculate an estimative shake amount in the horizontal and vertical directions is calculated, and the calculated shake amount is stored in the memory 56. An estimative shake amount calculation in the horizontal and vertical directions enables "ShakeCorrection" in Step #20. Either one of the sensing regions A1 and A2 is selected to calculate an estimative shake amount. Upon completion of estimative shake amount calculation, the control data $SD_{GH}$, $SD_{GV}$ are set in the driving section 6.

After the shake detection is completed, the shutter 23 is opened in response to a shutter opening command signal (in step #15), and a routine "Shake Correction" which is described later is executed (in Step #20). After shake correction is completed, the shutter 23 is closed in response to a shutter closing command signal (in Step #25), and this routine ends.

In this embodiment, the horizontal correction lens 31 and the vertical correction lens 32 of the correction lens unit 3 are moved to their respective center positions in Step #5. Alternatively, before this routine starts, the horizontal correction lens 31 and the vertical correction lens 32 may be moved to the respective center positions.

Next, the routine "Shake Correction" is described with reference to FIG. 13. When the routine "Shake Correction" starts, a shake amount in the horizontal and vertical directions is detected (in Step #100), and the detected shake amount is stored in the memory 56.

Thereafter, it is judged whether a main object image is detected to be in the selected sensing region A1 (or A2) in Step #105, and it is judged whether the horizontal correction lens 31 (or the vertical correction lens 32) reaches its end position (in Step #110).

Subsequently, it is judged whether the object image sensed by the sensing region A1 (or A2) has a contrast lower than the threshold value to judge whether shake correction is executable (in Step #115).

If it is judged that the object image sensed by the sensing region A1 (or A2) has a contrast higher than the threshold value (NO in Step #115), then, it is judged whether shake correction is executable on a judgement result of Step #105 (in Step #120).

If the judgement result of Step #120 is that the main object image is detected to be in the selected sensing region A1 (or A2) (NO in Step #120), then, it is judged whether shake correction is executable based on a judgement result of Step #110.

If the judgement result in Step #110 is that the horizontal correction lens 31 and the vertical correction lens 32 do not reach their respective end positions (NO in Step #125), an estimative shake amount is calculated based on the shake amount stored in the horizontal and vertical directions in the memory 56 (in Step #130). The respective calculated shake amounts in the horizontal and vertical directions are converted into target angular positions subject to a temperature correction, and converted into target positions in the horizontal and vertical directions. Target position data in the horizontal and vertical directions are set in the driving section 6 as control data $SD_{PH}$, $SD_{PV}$ (in Step #135). The horizontal correction lens 31 and the vertical correction lens 32 are moved to such a position as to cancel a displacement of an object image due to camera shake.

Subsequently, it is judged whether a flag Fg indicative of correction disablement is set at "1" (in Step #140). If the flag Fg is not set at "1" (NO in Step #140) (i.e., shake correction is executable), it is judged whether the time Tc counted from the opening of the shutter 23 reaches the optimum exposure time $t_{SS1}$ (in Step #145). If $Tc<t_{SS1}$ (NO in Step #145), this routine returns to Step #100. If $Tc \geq t_{SS1}$ (YES in Step #145), this routine ends.

If the flag Fg is set at "1" (YES in Step #140), it is judged whether the time Tc reaches the minimum exposure time $t_{SS2}$ (in Step #150). If $Tc<T_{SS2}$ (NO in Step #150), the routine returns to Step #100. If $Tc \geq t_{SS2}$ (YES in Step #150), the routine ends.

On the other hand, if it is judged that the object image has a contrast lower than the predetermined value (YES in Step #115), it is judged whether the time TM1 reaches the time tg (in Step #155). If TM1$\geq$tg (YES in Step #155), the flag Fg is set at "1" (in Step #160), and the routine goes to Step #140.

If TM1<tg (NO in Step #155), the timer 83 resets the time TM1 at "0" (in Step #165). Subsequently, the shake correction judging section 58 outputs a reset command signal to the target position setter 53, which in turn outputs latest target position data before receiving the reset command signal as control data $SD_{PH}$, $SD_{PV}$ to the driving section 6 (in Step #170). The horizontal correction lens 31 and the vertical correction lens 32 are held at their respective instant positions immediately before receiving the reset command signal. Thereafter, the routine goes to Step #140.

If it is judged that the main object image is out of the sensing region A1 (or A2) (YES in Step #120), it is judged whether the time TM2 reaches the predetermined time tg (in Step #175). If TM2$\geq$tg (YES in Step #175), the routine goes to Step #160.

If TM2<tg (NO in Step #175), the timer 83 resets the time TM2 at "0" (in Step #180). Subsequently, the shake correction judging section 58 outputs the reset command signal to the target position setter 53, which in turn outputs latest target position data before receiving the reset command signal as control data $SD_{PH}$, $SD_{PV}$ to the driving section 6 (in Step #185). The horizontal correction lens 31 and the vertical correction lens 32 are held at their respective instant positions immediately before receiving the reset command signal. Thereafter, the routine goes to Step #140.

On the other hand, if it is judged that the horizontal correction lens 31 (or the vertical correction lens 32) reaches its end position (YES in Step #125), it is judged whether the time TM3 counted by the timer 83 reaches the predetermined time tg (in Step #190). If TM3$\geq$tg (YES in Step #190), the routine goes to Step #160.

If TM3<tg (NO in Step #190), the timer 83 resets the time TM3 at "0" (in Step #195). The shake correction judging section 58 outputs a reset command signal to the target position setter 53, which in turn outputs the latest target position data before receiving the reset command signal as control data $SD_{PH}$, $SD_{PV}$ to the driving section 6 (in Step #200). The horizontal correction lens 31 and the vertical correction lens 32 are held at their respective instant positions immediately before receiving the reset command signal. Thereafter, the routine goes to Step #140.

In this embodiment, the times TM1, TM2, TM3 are compared with the correction resume limit time tg. As an altered arrangement, it may be appreciated to provide correction resume limit times for times TM1, TM2, TM3, respectively, and compare the times TM1, TM2, TM3 with the corresponding limit times. For example, the limit time for time TM1 may be set shorter than the limit times for times TM2 and TM3 because there is a less possibility of resuming shake correction in the case where correction disablement is caused by a low contrast.

The minimum exposure time $t_{SS2}$ may be changed in accordance with the type of film since this time follows such characteristics of film as film sensitivity.

In this embodiment, the shake correction judging section 58 judges whether a proper shake correction is executable based on one of the three parameters, i.e., low contrast, out-of-region, and end position. Alternatively, shake correction may be suspended in the case where an anomalous state of the correction lens driving system or the shake detecting section 4 is detected. The anomalous state of the correction lens driving system is, for example, that the control of the correction lens driving system is deteriorated due to vibration of the correction lens unit 3 and the like. The anomalous state of the shake detecting section 4 is, for example, that an estimative shake amount is exceedingly large beyond an expectation.

Figure 13:
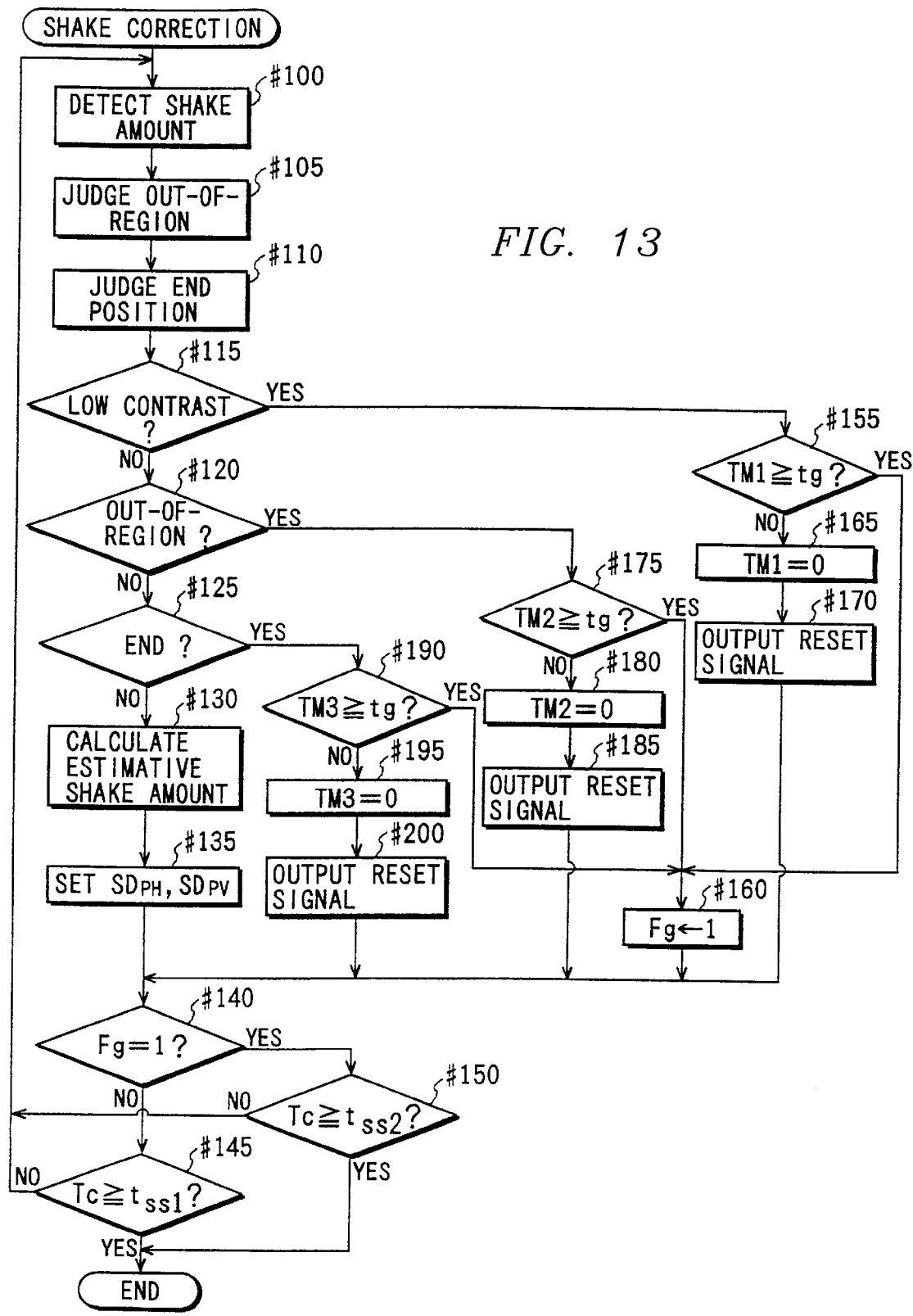
FIG. 13 is a flowchart of a routine "Shake Correction"

In this embodiment, the operations of Steps #105, #110 are executed before Steps #115 and #120 in FIG. 13. Alternatively, the operation of Step #105 may be executed immediately before Step #120, and the operation of Step #110 may be executed immediately before Step #125. In this altered arrangement, the operations of Steps #105 and #110 can be omitted in the case where it is judged that a proper shake correction is suspended because of a low contrast.

The end judging device 583 judges that the horizontal correction lens 31 (or the vertical correction lens 32) has reached the extreme end position of its allowable range based on an output from the position data input device 57 in this embodiment. As an altered arrangement, the reach of the end position may be detected by a mechanical switch and the like.

In this embodiment, shake correction is resumed upon the lapse of the predetermined time tg. As an altered form, shake correction may resumed without waiting for the lapse of the predetermined time tg.

As mentioned above, the exposure is maintained for a predetermined minimum exposure time in accordance with occurrence of a shake correction disablement. Accordingly, an object image can be taken up under less influence of camera shake.

The exposure is maintained for the minimum exposure time if a shake correction disablement occurs before lapse of the minimum exposure time. In other words, the exposure is finished immediately after lapse of the minimum time necessary for exposure. Accordingly, the photographed image receives less influence of camera shake.

Also, if a shake correction disablement occurs after the minimum exposure time, the exposure is finished even before an initially set optimum exposure time elapses. This ensures a photographed image having a less influence of camera shake.

Further, the minimum exposure time is set at a value to make it possible to correct an image deterioration due to an insufficient exposure in the process of printing. This will eliminate the influence of camera shake to a photographed image as small as possible.

Further, shake correction is resumed in the exposure if the shake correction disablement state disappear in a shorter time than a predetermined time. This will more reduce the influence of camera shake to a photographed image.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera provided with a function of shake correction during exposure, the camera comprising:

an image taking unit which exposes a photosensitive medium to a light image of an object;

a sensor which senses a light image of an object to detect a camera shake;

an exposure time setter which sets a first exposure time based on a brightness of an object, and a second exposure time different from the first exposure time; and a controller which judges, based on whether the sensor senses a light image having a contrast lower than a predetermined contrast for a predetermined time, as to whether the shake correction is not executable, and controls the exposure of the photosensitive medium with reference to the second exposure time when the shake correction is judged to be not executable.

2. A camera according to claim 1, wherein when the shake correction is judged to be not executable before lapse of the second exposure time, the controller stops the exposure of the photosensitive medium immediately after lapse of the second exposure time.

3. A camera according to claim 1, wherein when the shake correction is judged to be not executable after lapse of the second exposure time, the controller stops the exposure of the photosensitive medium immediately after the shake correction is judged to be not executable.

4. A camera according to claim 1, wherein the second exposure time is equal to or smaller than a half of the first exposure time.

5. A camera provided with a function of shake correction during exposure, the camera comprising:

an image taking unit which exposes a photosensitive medium to a light image of an object;

a sensor which senses a light image of an object to detect a camera shake;

an exposure time setter which sets a first exposure time based on a brightness of an object, and a second exposure time different from the first exposure time; and a controller which judges, based on whether a light image of a particular object is shifted more than a predetermined amount with respect to the sensor, as to whether the shake correction is not executable, and controls the exposure of the photosensitive medium with reference to the second exposure time when the shake correction is judged to be not executable.

6. A camera according to claim 5, wherein when the shake correction is judged to be not executable before lapse of the second exposure time, the controller stops the exposure of the photosensitive medium immediately after lapse of the second exposure time.

7. A camera according to claim 5, wherein when the shake correction is judged to be not executable after lapse of the second exposure time, the controller stops the exposure of the photosensitive medium immediately after the shake correction is judged to be not executable.

8. A camera according to claim 5, wherein the second exposure time is equal to or smaller than a half of the first exposure time.

9. A camera provided with a function of shake correction during exposure, the camera comprising:

an image taking unit which exposes a photosensitive medium to a light image of an object;

a sensor which senses a light image of an object to detect a camera shake;

a correction lens which corrects a camera shake, and is movable in a predetermined range;

an exposure time setter which sets a first exposure time based on a brightness of an object, and a second exposure time different from the first exposure time; and a controller which judges, based on whether the correction lens reaches an end of the predetermined range, as to whether the shake correction is not executable, and controls the exposure of the photosensitive medium with reference to the second exposure time when the shake correction is judged to be not executable.

10. A camera according to claim 9, wherein when the shake correction is judged to be not executable before lapse of the second exposure time, the controller stops the exposure of the photosensitive medium immediately after lapse of the second exposure time.

11. A camera according to claim 9, wherein when the shake correction is judged to be not executable after lapse of the second exposure time, the controller stops the exposure of the photosensitive medium immediately after the shake correction is judged to be not executable.

12. A camera according to claim 9, wherein the second exposure time is equal to or smaller than a half of the first exposure time.

13. A camera provided with a function of shake correction during exposure, the camera comprising:

an image taking unit which exposes a photosensitive medium to a light image of an object;

an exposure time setter which sets a first exposure time based on a brightness of an object, and a second exposure time to ensure an exposure amount necessary to enable image correction in the process of printing a taken-up image; and a controller which judges as to whether the shake correction is not executable, and controls the exposure of the photosensitive medium with reference to the second exposure time when the shake correction is judged to be not executable.

14. A camera according to claim 13, wherein when the shake correction is judged to be not executable before lapse of the second exposure time, the controller stops the exposure of the photosensitive medium immediately after lapse of the second exposure time.

15. A camera according to claim 13, wherein when the shake correction is judged to be not executable after lapse of the second exposure time, the controller stops the exposure of the photosensitive medium immediately after the shake correction is judged to be not executable.

16. A camera according to claim 13, wherein the second exposure time is equal to or smaller than a half of the first exposure time.

17. A camera provided with a function of shake correction during exposure comprising:
- an image taking unit which exposes a photosensitive medium to a light image of an object;
- a controller which judges whether the shake correction is not executable, and stops the shake correction when the shake correction is judged to be not executable; and
- a timer which measures a lapse of time after the shake correction is stopped;
- wherein the controller compares said measured lapse of time with a predetermined reference time, and controls the exposure of the photosensitive medium in accordance with a comparison result.

18. A camera according to claim 17, wherein the controller resumes the shake correction when the shake correction is judged to be executable before lapse of the predetermined reference time.

19. A camera according to claim 17, wherein the controller stops the exposure of the photosensitive medium immediately after a measured lapse of time becomes greater than the predetermined reference time.

20. A camera according to claim 17, further comprising an exposure time setter which sets an exposure time based on a brightness of an object, and wherein the predetermined reference time is equal to or smaller than a half of the set exposure time.

* * * * *